United States Patent [19]

Richards

[11] Patent Number: 4,782,619
[45] Date of Patent: Nov. 8, 1988

[54] MODULAR FISHING TACKLE BOX

[76] Inventor: Mark S. Richards, 8285 Englewood, Clarkston, Mich. 48016

[21] Appl. No.: 80,906

[22] Filed: Aug. 3, 1987

[51] Int. Cl.$^4$ .......................... A01K 97/06; A47B 87/02
[52] U.S. Cl. ........................................ 43/54.1; 43/57.1; 312/111; 312/DIG. 33
[58] Field of Search ................ 43/54.1, 57.1; 312/111, 312/DIG. 33; 206/315.11

[56] References Cited

U.S. PATENT DOCUMENTS

| | | | |
|---|---|---|---|
| 3,330,606 | 7/1967 | Druger, Jr. | 312/111 |
| 3,348,329 | 10/1967 | Seemann | 43/26 |
| 3,461,599 | 8/1969 | Sylvester | 43/57.1 |
| 3,481,066 | 12/1969 | Woolworth | 43/57.1 |
| 3,507,071 | 4/1970 | Bryson | 43/57.1 |
| 3,780,468 | 12/1973 | Maffett | 43/54.1 |
| 3,947,991 | 4/1976 | Morcom | 43/54.1 |
| 4,085,987 | 4/1978 | Vartdal | 312/269 |
| 4,176,491 | 12/1979 | Herring | 43/57.1 |
| 4,245,422 | 1/1981 | Souza | 43/57.1 |
| 4,541,539 | 9/1985 | Matthews | 220/20 |
| 4,555,862 | 12/1985 | Panasewich | 43/54.1 |
| 4,563,834 | 1/1986 | Spencer | 43/54.1 |
| 4,643,494 | 2/1987 | Marleau | 312/DIG. 33 X |
| 4,662,515 | 5/1987 | Newby, Sr. | 312/DIG. 33 X |

FOREIGN PATENT DOCUMENTS 1109738  2/1956  France .................... 43/57.1

*Primary Examiner*—Nicholas P. Godici
*Assistant Examiner*—Carmine Cuda
*Attorney, Agent, or Firm*—Gifford, Groh, Sheridan, Sprinkle and Dolgorukov

[57] ABSTRACT

A modular fishing tackle box includes a box portion, a lid, and a plurality of modular members detachably securable beneath the box portion and to each other. The modular members can each include one or more transversely slidable drawers for containing fishing tackle or the like, accessible without detachment of the modular members from the box portion. Alternatively, the modular members can themselves be dimensioned to receive tackle therein, and moved with respect to the box portion or associated members so as to expose the fishing tackle for use. The modular members are connected to the box portion or each other by a pair of spaced slidable tongue and groove joints on the top and bottom of each member, and the bottom of the box portion. The joints are each formed as a pair of L-shaped flanges. The fishing tackle box is constructed throughout from an inert, molded plastic material, resistant to rusting and corrosion, especially from salt water.

13 Claims, 2 Drawing Sheets

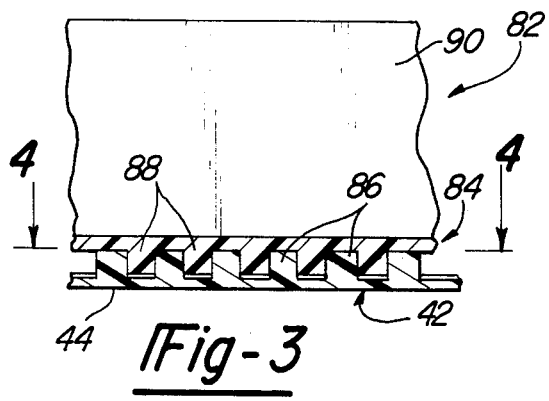
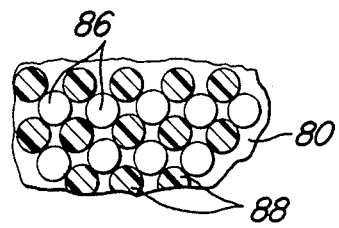
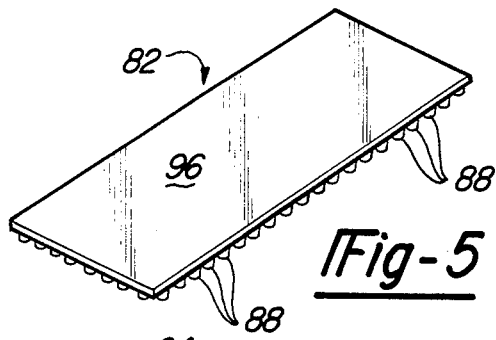
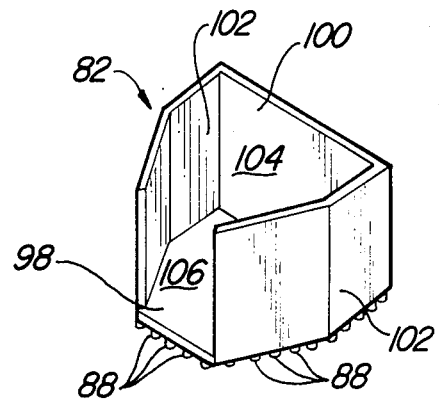
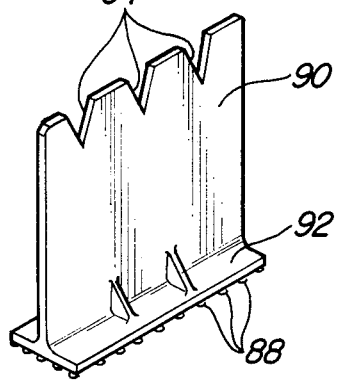
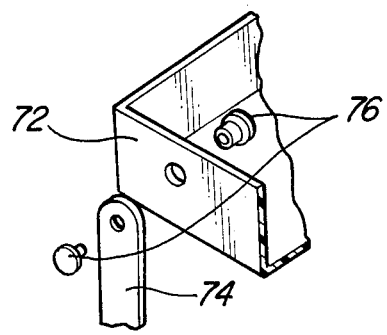

MODULAR FISHING TACKLE BOX

BACKGROUND OF THE INVENTION

I. Field of the Invention

The present invention is directed to a container, and more particularly to a construction for a fishing tackle box.

II. Description of the Prior Art

It has long been known to employ a tackle box to contain fishing gear such as sinkers, lines, leaders, lures, reels and the like, generally referred to as tackle. Tackle boxes often include a plurality of trays for containing such tackle. The trays are sometimes connected by a plurality of pivotable links, so that the trays are pivotable from a vertically stacked to a horizontally spread position, in which access to the contents of all of the trays can be simultaneously had. The plurality of trays can also be vertically stacked, either nestingly, or detachably connected to one another by hasp latches or the like; and either contained in the tackle box, or (in the latter case) attached to the outside of the tackle box.

While the prior tackle boxes have functioned adequately for their intended purpose, their use has entailed some drawbacks. When separate trays are employed, the trays can take up significant space if the contents of more than one tray at a time are displayed. The waste of such space is particularly a problem when the tackle box is employed in a small boat. This problem can be avoided when stacked external trays are employed, as the trays which are not of interest can be reaffixed to the tackle box while one tray is in use. Such reattachment is inconvenient, however, especially when the user is not certain which tray contains the particular piece of tackle of interest.

While this particular problem is not encountered when the tackle box employs a plurality of pivotable trays, other drawbacks are encountered when such boxes are used. Most notably, the capacity of a tackle box of fixed volume is not adjustable to match the amount of tackle needed for the particular conditions under which fishing is intended. Overfilling the box or trays results in entanglement of the pieces of tackle, making extraction of the individual tackle pieces from the box difficult, while excess capacity in the box or trays is wasteful, and needlessly increases the weight carried by the fisherman. Each of these problems is particularly onerous if the tackle box must be carried some distance to the fishing site.

SUMMARY OF THE PRESENT INVENTION

The present invention overcomes these and other problems by providing a modular fishing tackle box construction whose component members are readily securable to one another to assure that the box has adequate capacity for tackle, yet which allows avoidance of the excess weight associated with the presence of excess capacity. The fishing tackle box of the present invention comprises a box portion having a bottom, sidewalls, end walls and an open top; a lid fitting over the open top of the box; a modular member defining either a compartment, or a shelf for receiving a drawer thereon; and means for detachably connecting the modular member to the bottom of the box portion. The connecting means preferably comprises a pair of horizontal sliding tongue and groove joints on the box bottom and on the top of the member. The tongue and groove joints are formed as a pair of L-shaped flanges, one pair of flanges on each of the box and the modular member. Preferably, a plurality of such modular members is included, each having a similar pair of L-shaped flanges on both their top and bottom. The tongue and groove connections are dimensioned to allow frictional but reversible locking of the box and modular members to one another. Also preferably, the invention comprises one or more drawers for holding tackle, received on the shelf defined by the modular members. Alternatively, the modular members themselves can serve to contain tackle. The box and modular members are constructed from an inert, plastic material.

The present invention is advantageous over prior tackle boxes in being of simple construction yet possessing sufficient capacity to contain tackle for any need, by the addition of one or more modular members to the box. However, the excess weight associated with an overly large box can be avoided by the removal of modular members not needed for adequate capacity. The use of plastic as the material of the box obviates any rusting of the connecting means which might otherwise prevent detachment or securement of the modular members to the box. The invention is also advantageous in that no hasps or clips are needed for securement, which might be subject to breakage or loosening. Indeed, the horizontal tongue and groove joints ensure ready assembly or dissasembly of tackle box construction even when hands are covered by mittens or glooves during ice fishing.

BRIEF DESCRIPTION OF THE DRAWING

A better understanding of the present invention will now be had upon reference to the following detailed description, when read in conjunction with the accompanying drawing, wherein like reference characters refer to like parts throughout the several views, and in which:

FIG. 3 is a cross-sectional view of a portion of the preferred embodiment of the present invention;

FIG. 4 is a cross-sectional view taken along line 4-4 in FIG. 3;

FIG. 5 is a perspective view of another portion of the preferred embodiment of the present invention;

FIG. 6 is a perspective view of another portion of the preferred embodiment of the present invention;

FIG. 7 is a perspective view of another portion of the preferred embodiment of the present inveniton; and FIG. 8 is an exploded view of a portion of the preferred embodiment of the present invention.

DETAILED DESCRIPTION OF THE PREFERRED EMBODIMENT OF THE PRESENT INVENTION

Figure 1:
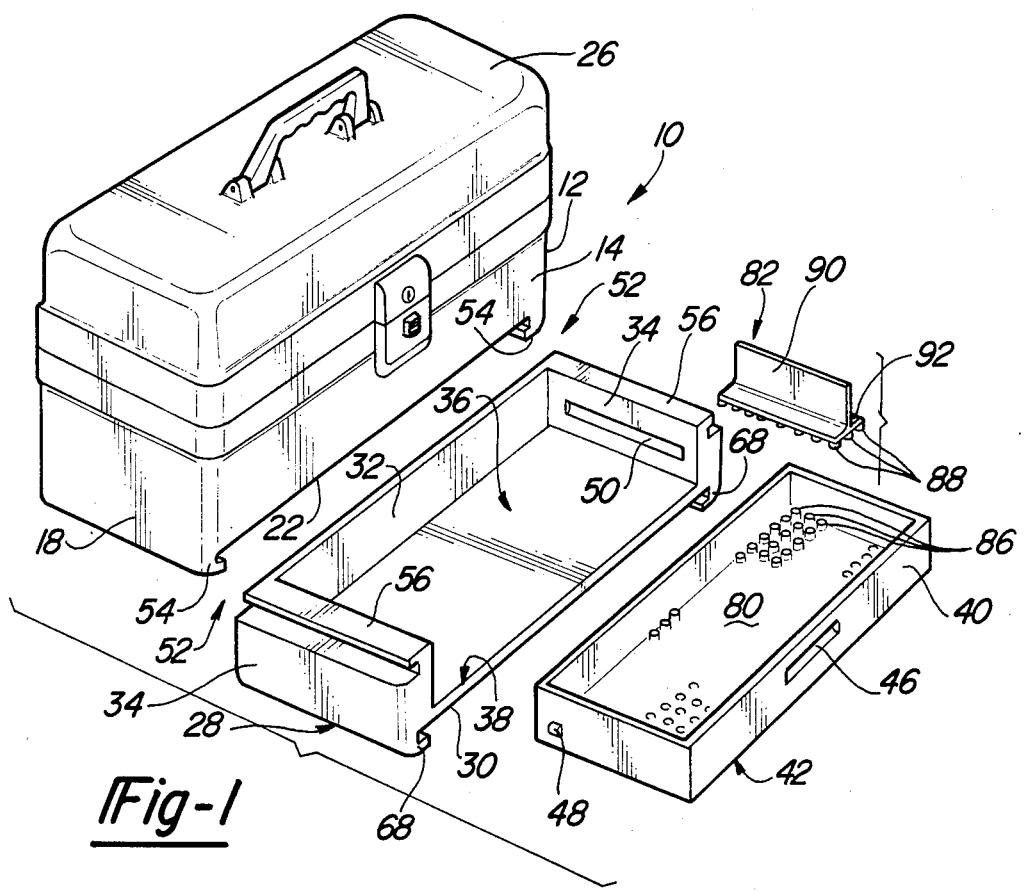
FIG. 1 is an exploded view of a preferred embodiment of the present invention.
Figure 2:
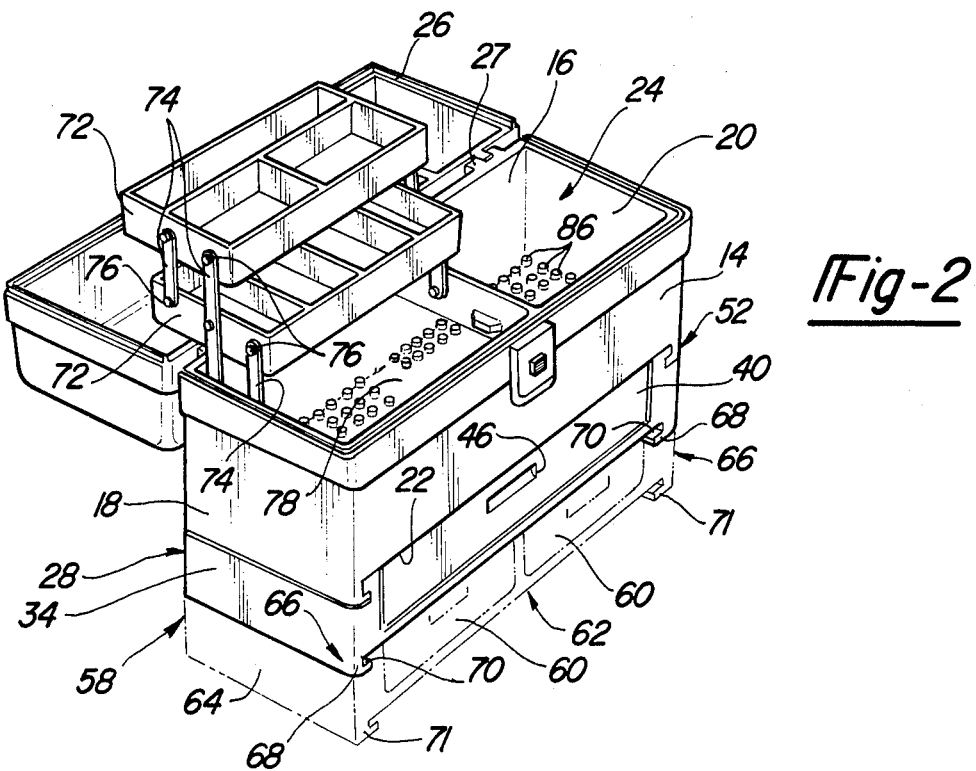
FIG. 2 is a perspective view of the preferred embodiment of the present inventon.

With reference first to FIGS. 1 and 2, a modular tackle box 10 according to the present invention is thereshown first comprising a box portion 12 having a parallel pair of opposed box sidewalls 14 and 16; a parallel pair of opposed box end walls 18 and 20, disposed perpendicularly to and connecting the box sidewalls 14 and 16; and a horizontal bottom 22 connected to the sidewalls 14 and 16, and the end walls 18 and 20, disposed perpendicularly to them. The box portion 12 thus defines an open box top 24. The tackle box 10 also includes a lid 26 which fits over the open box top 24 in abutment with the box sidewalls 14 and 16 and the box end walls 18 and 20. Preferably, the lid 26 is connected by a pair of hinges 27 to one of the sidewalls, for example, the sidewall 16.

The tackle box 10 of the present invention also comprises at least one and preferably a plurality of modular members 28 detachably connected to the box portion 12 beneath the box bottom 22. The modular member 28 can define a compartment for containing fishing tackle, but preferably define a shelf for sliding attachment of a drawer in the modular member 28. More particularly, the modular member 28 comprises a member bottom 30, a member sidewall 32 extending perpendicularly upwardly from the member bottom 30, and a pair of member end walls 34 also extending perpendicularly upwardly from the member bottom, at either end of the member sidewall 32. A portion 36 of the member bottom 30 defines a shelf surface 38 thereon.

The tackle box 10 also comprises at least one drawer 40 received in the member 28 on the shelf surface 38. More particularly, the drawer 40 comprises a bottom 42 including a portion defining a shelf surface 44 (more clearly shown in FIG. 3) received on the shelf surface 38 of the member 28. The drawer 40 also includes a handle 46 disposed outwardly from the member 28. A pair of stops 48 on the drawer 40 are received one each in a pair of elongated recesses 50 formed on the facing sides of the member end walls 34.

Still with reference to FIGS. 1 and 2, the tackle box 10 additionally comprises a means 52 for detachably connecting the member 28 to the bottom 22 of the box portion 12. Preferably, the connecting means 52 is formed as a spaced pair of sliding tongue-and-groove joint formed by a first pair of L-shaped flanges 54 on the bottom 22 of the box portion 12, beneath the box end walls 18 and 20, and a second pair of L-shaped flanges 56 on the modular member 28 above the member end walls 34, opposite the member bottom 30. Each of the flanges 54 and 56 thus define a groove for receiving a portion of the other L-shaped flange 56 and 54. The flanges 54 and 56 are preferably dimensioned so that they are slidably but frictionally engaged so as to restrict but not preclude detachment of the member 28 from the box portion 12.

The tackle box 10 of the present invention preferably comprises at least a second modular member 58, for example, having a pair of drawers 60 and associated shelf surfaces on which the drawers 60 rest. The second modular member 58 comprises a second member bottom 62 and a pair of second member end walls 64. The box construction 10 also comprises a means 66 for detachably connecting the second modular member 58 to either the box portion 12 or the first modular member 28. Preferably, the connecting means 66 is a sliding tongue and groove joint formed in the same fashion as the connecting means 52, by a pair of third L-shaped flanges 68 on the bottom 30 of the first member 28, beneath the member end walls 34, and a pair of fourth L-shaped flanges 70 formed on the second modular member 58 above the second member endwalls 64, opposite the second member bottom 62. The third and fourth pairs of L-shaped flanges 68 and 70 are dimensioned similar to the flanges 54 and 56, so that the second modular member 58 can be connected to either the bottom 30 of the first modular member 28, or the bottom 22 of the box portion 12. A pair of fifth L-shaped flanges 71 are also provided on the bottom 62 of the second member 58 beneath the second member end wall 64, for connection of additional modular members not shown in the drawing.

Conveniently, the tackle box portion 12 contains a conventional plurality of individual trays 72 connected by a plurality of pivotable links 74, attached together by a number of rivet members 76. The stack of trays 72 is thus movable in a conventional fashion from a vertical stack (not shown) to the horizontally and vertically offset stack shown in FIG. 2.

The box portion 12 also includes an interior horizontal surface 78, while the drawer 40 includes an interior horizontal surface 80. The tackle box 10 preferably includes at least one and most preferably more than one wall defining member 82 insertable into the interior of the box portion 12 or the drawer 40. Also preferably, a means 84 is included for detachably mounting the wall defining member 82 to the interior horizontal surface 78 of the box portion 12 or the interior horizontal surface 80 of the drawer 40. As shown in FIGS. 1 through 4, the detachable mounting means 84 comprises a regular, closely spaced array of cylindrical legs 86 formed on the interior surfaces 78 and 80, and a regular array of closely spaced cylindrical legs 88 formed on the wall defining member 82. The individual legs 86 are frictionally trapped between the individual legs 88, and vice versa, in order to attach the wall defining member 82 to the surface 78 or 80.

The wall defining member 82 can take any one of several configurations. For example, as shown in FIGS. 1 and 4, the wall defining member 82 can act as a compartment divider to subdivide the interior of the drawer 40 or box portion 12. Such a divider comprises a vertical wall 90 perpendicularly connected to a horizontal flange 92, the legs 88 being formed on the bottom of the flange 92 opposite the wall 90. Alternatively, the member 82 can be adapted for holding particular items of tackle. Such a tackle holder is shown in FIG. 7 and comprises the same vertical wall 90 and horizontal flange 92 as the component divider, but additionally includes a plurality of notches 94 formed on an upper edge of the vertical wall 90 opposite the horizontal flange 92.

A less complex version of the wall defining member 82 provides a flat surface in the box portion 12 or the drawer 40, in order to prevent the entanglement of tackle with the legs 86 on the interior surfaces 78 and 80, respectively. As shown in FIG. 5, such a member 82 simply comprises a horizontal wall 96 having the cylindrical legs 88 formed thereon.

Lastly, the wall defining member 82 can be configured as a holder for a fishing reel or the like, and in such a case comprises a bottom wall 89 having the legs 88 formed thereon; a perpendicular rear wall 100; and a pair of inwardly tapering sidewalls 102 extending perpendicular from the bottom wall 98 and extending from the rear wall 100. The walls 98, 100 and 102 together define an open top 104 and an open front end 106 for receiving the reel or other tackle therein. This construction is more particularly shown in FIG. 6.

The tackle box 10 of the present invention is substantially constructed throughout of an inert, molded plastic material, resistive to rusting and corrosion, particularly from salt water. This not only permits the tackle box 10 to be of lightweight construction, as well as being inexpensive to manufacture, but also reduces the chance of binding of the tongue and groove joints connecting modular members 28, 58 and the like to the box portion 12. Such a material also permits the tackle box 10 to be highly resistant to damge from rough transport or high seas.

While it is preferred that the modular member 28 defines a shelf 38 receiving the drawer 40 thereon, it is also within the scope of the present invention that the modular member 28 itself serves as a container for fishing tackle. In such a case, instead of the sliding the drawing 40 out of the member 28, the member 28 itself is simply slid along the tongue and groove joint away from the box portion 12, so as to expose the contents therein. It is preferred in such a case that the modular member 28 includes a second sidewall 32 extending across the opening through which the drawer 40 is inserted, in the embodiment disclosed in the drawing. The upper facing surfaces of the flanges 54 thus serve as the shelf surfaces in which the container slides.

Having described my invention, however, many modifications thereto will become apparent to those skilled in the art to which it pertains, without deviation from the spirit of the present invention, as defined by the scope of the appended claims.

I claim:

1. A modular fishing tackle box comprising:
   a box portion including a pair of opposed vertical sidewalls, a pair of opposed vertical end walls disposed between and connecting said sidewalls, a horizontal bottom connecting said sidewalls and end walls, and an open top opposite said bottom;
   a lid fitting over said open top of said box portion and engageable with said sidewalls and end walls opposite said box bottom;
   at least two shelf members each including an upper portion, a bottom and a shelf portion defining an upwardly facing horizontal shelf surface;
   at least two drawers each including a drawer portion defining a downwardly facing horizontal surface dimensioned to be restable upon and slidable along one or both of said horizontal shelf surfaces; and
   means for selectively reversibly detachably connecting either of said shelf members to said bottom of said box portion or to the other end of said shelf members;
   wherein said connecting means comprises a pair of spaced horizontally disposed sliding tongue and groove joints on each of said box bottom, said member bottoms, and said member upper portions.

2. The invention according to claim 1, wherein said second shelf member includes a pair of coplanar second shelf portions defining a coplanar pair of horizontal second shelf surfaces, and said tackle box further comprises a pair of second drawers each including a second drawer portion defining a downwardly facing horizontal surface dimensioned to be restable upon and slidable along said horizontal second shelf surface.

3. The invention according to claim 1, wherein each of said joints is formed as a first L-shaped flange on said box bottom and a second L-shaped flange on said shelf member.

4. The invention according to claim 1, further comprising a stacked plurality of pivotably linked trays disposed in said box portion.

5. The invention according to claim 1, further comprising at least one wall-defining member insertable into at least one of said box portion and said drawer.

6. The invention according to claim 5, wherein said box portion and said drawer each include a horizontal interior surface, and wherein said tackle box further comprises means for mounting said wall defining member to said horizontal interior surface of one of said box portion and said drawer.

7. The invention according to claim 6, wherein said mounting means comprises a close array of cylindrical legs extending from said horizontal surfaces of said box portion and said drawer, and a frictionally engageable close array of similar legs on said wall defining member.

8. The invention according to claim 6, wherein said wall defining member comprises a horizontal wall adapted to cover at least part of said horizontal interior surface of one of said box bottom and said drawer.

9. The invention according to claim 5, wherein said wall defining member is insertable at a plurality of different locations in said one of said box bottom and said drawer.

10. The invention according to claim 5, wherein said wall defining member comprises a planar vertical wall.

11. The invention according to claim 10, wherein said wall comprises a tackle holder including an upper edge having a plurality of upwardly facing notches formed therein.

12. The invention according to claim 5, wherein said wall defining member comprises a fishing reel holder having a holder bottom wall, a vertical holder rear wall extending upwardly from said bottom wall, and a vertical pair of opposed and inwardly tapering holder sidewalls extending from said holder bottom wall and said holder rear wall, said holder walls together defining an open holder top and an open holder front.

13. A modular fishing tackle box comprising:
   a box portion including a pair of opposed vertical sidewalls, a pair of opposed vertical end walls disposed between and connecting said sidewalls, a horizontal bottom connecting said sidewalls and end walls, and an open top opposite said bottom;
   a lid fitting over said open top of said box portion and engageable with said sidewalls and end walls opposite said box bottom;
   a shelf member including a shelf portion defining an upwardly facing horizontal shelf surface;
   a drawer including a drawer portion defining a downwardly facing horizontal surface dimensioned to be restable upon and slidable along said horizontal shelf surface;
   means for detachably connecting said shelf member to said bottom of said box portion; and
   at least one wall-defining member insertable into at least one of said box portion and said drawer;
   wherein said box portion and said drawer each include a horizontal interior surface, and wherein said tackel box further comprises means for mounting said wall defining member to said horizontal interior surface of one of said box portion and said drawer, said mounting means comprising a close array of cylindrical legs extending from said horizontal surfaces of said box portion and said drawer, and a frictionally engageable close array of similar legs on said wall defining member.

* * * * *